Figure 1:
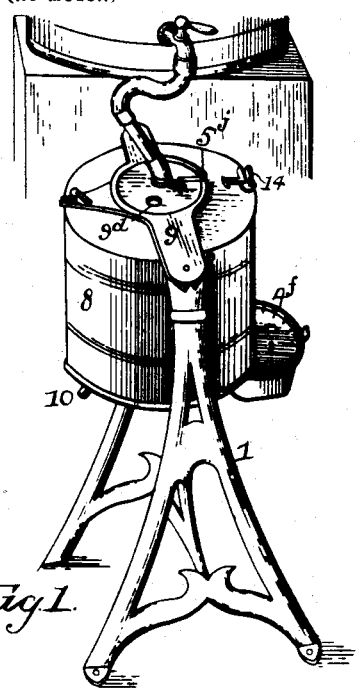

No. 684,075. Patented Oct. 8, 1901.
S. P. MACKEY & F. H. GILBERT.
LIQUID WEIGHING MACHINE.
(Application filed Feb. 9, 1900.)

(No Model.) 4 Sheets—Sheet 1.

Witnesses:
L. C. Henderson
H. I. Dygert

Inventors,
Samuel P. Mackey
Frank H. Gilbert
by T. J. Geisler
Atty.

THE NORRIS PETERS CO., PHOTO-LITHO., WASHINGTON, D. C.

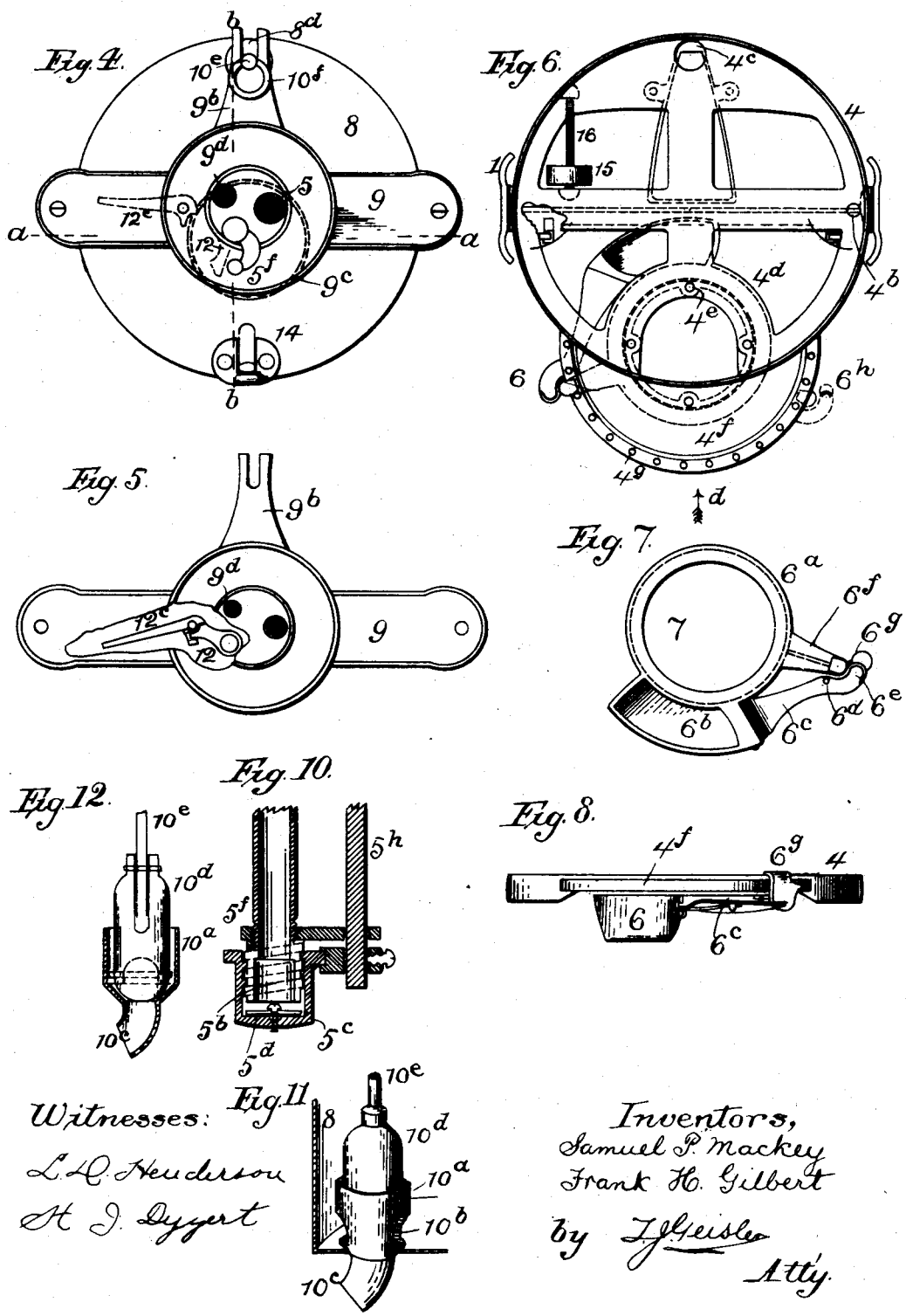

No. 684,075. Patented Oct. 8, 1901.
S. P. MACKEY & F. H. GILBERT.
LIQUID WEIGHING MACHINE.
(Application filed Feb. 9, 1900.)
(No Model.) 4 Sheets—Sheet 3.
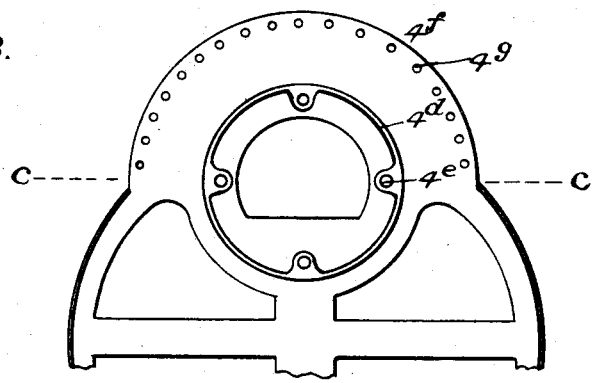
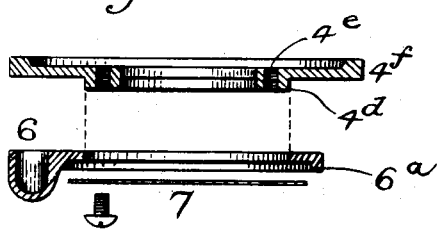
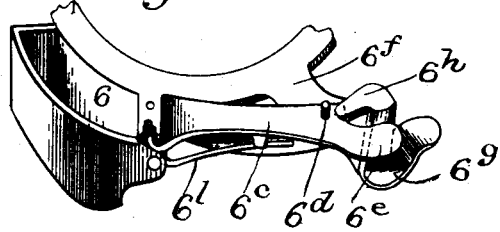
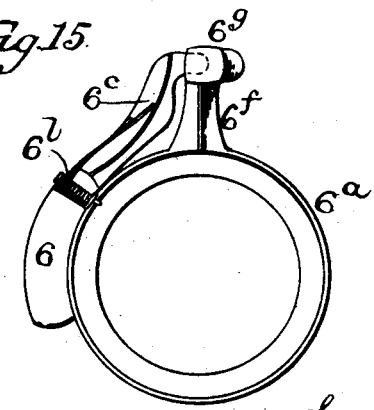
Witnesses:
L. C. Henderson
H. J. Dygert
Inventors,
Samuel P. Mackey
Frank H. Gilbert
by J. Geisler
Atty.

No. 684,075. Patented Oct. 8, 1901.
S. P. MACKEY & F. H. GILBERT.
LIQUID WEIGHING MACHINE.
(Application filed Feb. 9, 1900.)
(No Model.) 4 Sheets—Sheet 4.
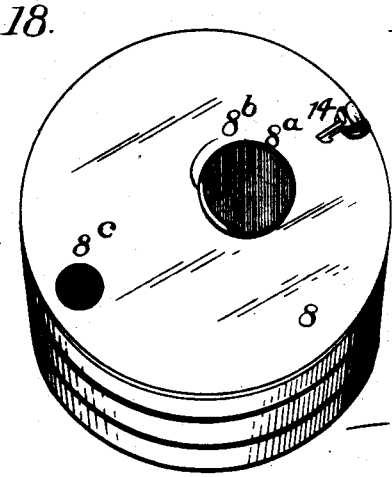
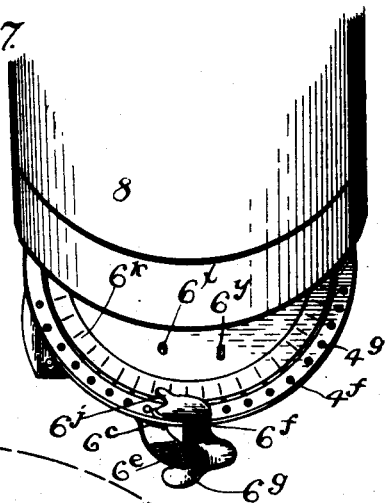
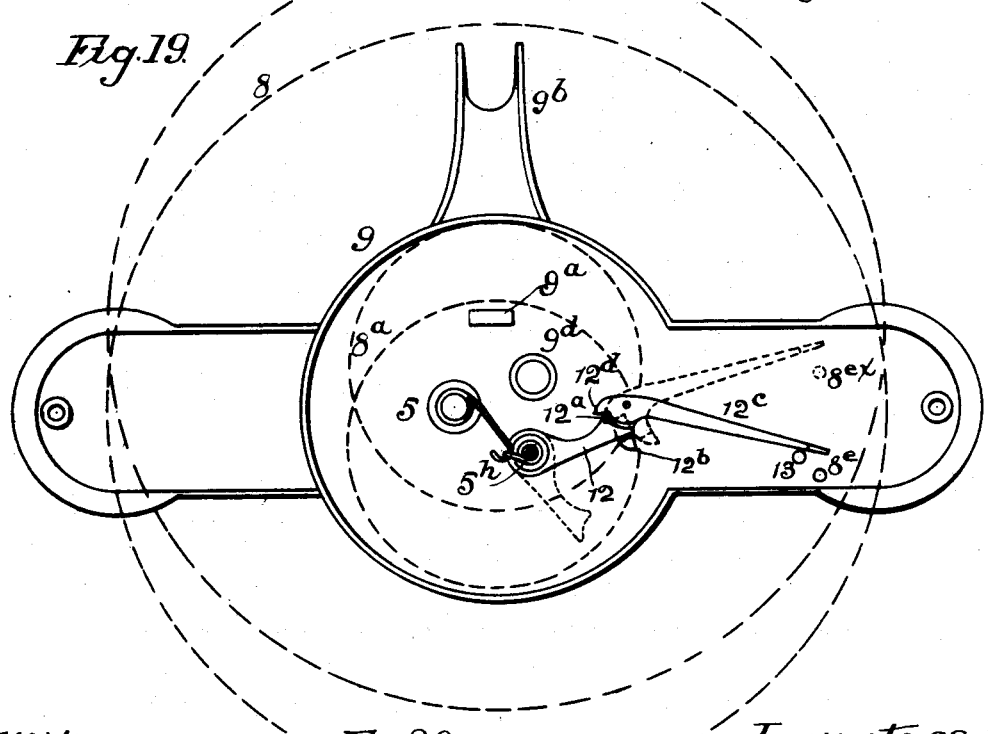
Witnesses:
L. C. Henderson
H. I. Dygert
Inventors
Samuel P. Mackey
Frank H. Gilbert
by T. J. Geisler
Atty.

UNITED STATES PATENT OFFICE.

SAMUEL P. MACKEY AND FRANK H. GILBERT, OF RIDGEFIELD, WASHINGTON.

LIQUID-WEIGHING MACHINE.

SPECIFICATION forming part of Letters Patent No. 684,075, dated October 8, 1901.

Application filed February 9, 1900. Serial No. 4,680. (No model.)

*To all whom it may concern:*

Be it known that we, SAMUEL P. MACKEY and FRANK H. GILBERT, citizens of the United States of America, and residents of Ridgefield, Clarke county, in the State of Washington, have invented certain new and useful Improvements in Liquid-Weighing Machines, of which the following is a specification, reference being had to the accompanying drawings as a part thereof.

Our invention relates to weighing-machines of the class comprising a rocking receptacle having axial bearings at its base and supported in a suitable frame or stand, the rocking motion of the receptacle being limited by suitable contrivances to an upright and tilting position and the discharge-faucet and inlet-valve of the receptacle operating automatically, in the sense of the former closing and the latter opening upon the tilting of the receptacle.

One object of our invention is to construct a reliable weighing-machine which will respond to all the requirements demanded thereof by the trades in which such machine would be used, and yet make the mechanism and contrivances used in the construction of such machines of as simple, durable, and inexpensive structure as possible, and the automatic valves are further to be of such structure as to operate as perfectly as possible, least liable to get out of order, and in case of becoming defective be readily readjusted and corrected.

Another of the features of our invention is that the measuring-weight is a part of the machine itself, accurately adjustable to weigh the variable volume of liquid which the receptacle may receive, but not removable. This form of construction possesses a great advantage over the system of employing loose weights, which are frequently misplaced, and thereby cause great annoyance. We use the term "measuring-weight" because the volume or bulk in liquid-measure is ascertained by weight of the liquid dispensed. Our machine is, however, adapted to dispense liquid by weight as well as by volume, the scale thereof having two sets of markings or graduations, one of which indicates the volume or bulk and the other the weight of the liquid dispensed. The contrivances and devices whereby we accomplish such objects are fully illustrated in the drawings above referred to and in the description thereof hereinafter given.

Figure 2:
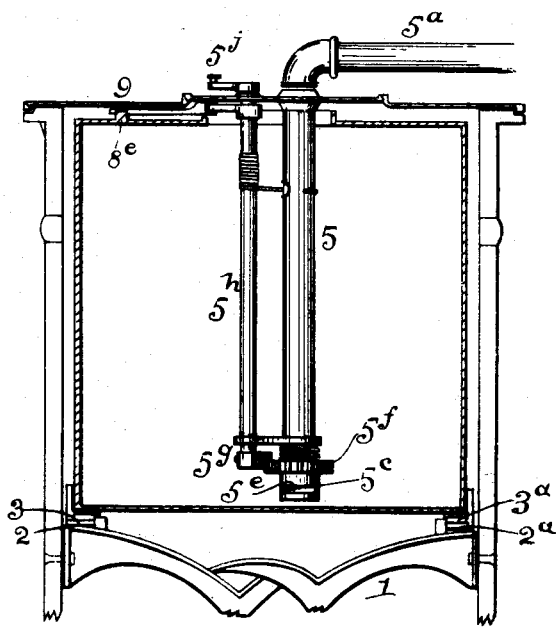
Figure 9:
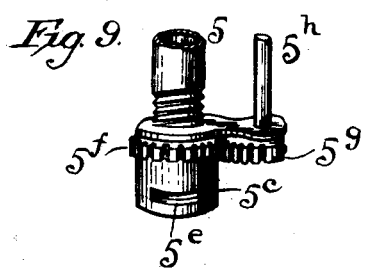
Figure 3:
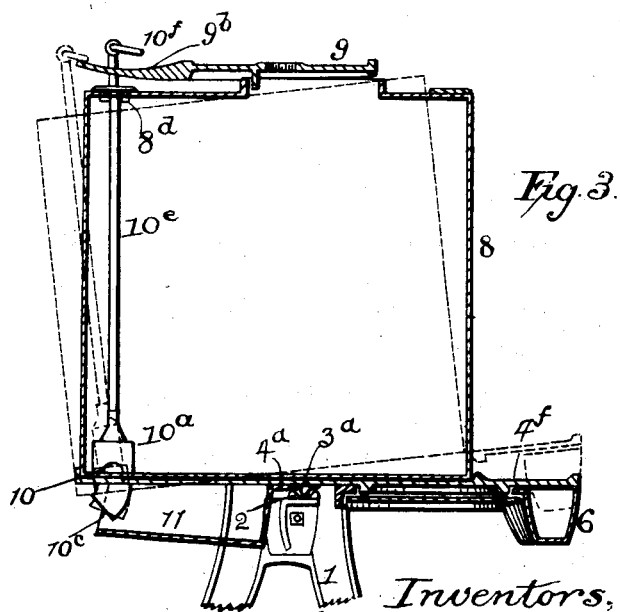

In the drawings, Figure 1 represents a perspective elevation of our newly-invented weighing-machine as the same would appear in practical use. Fig. 2 is a vertical section taken centrally through our machine on a line $a\ a$ of Fig. 4. Fig. 3 is another vertical section taken on a line $b\ b$ of Fig. 4 with the inlet pipe and valve and valve-operating mechanism removed. Fig. 4 is a top or plan view of our machine. Fig. 5 is a plan detail of the top plate of the supporting-frame, a portion of the plate being shown as broken away, so as to be able to see the automatic latch for the inlet-valve. Fig. 6 is a plan of the base-plate on which the liquid-receptacle is mounted, which base-plate provides a part of the axial bearings for the liquid-receptacle and carries the adjustable balancing and measuring weights. Fig. 7 is a detail in plan of the adjustable measuring-weight and its appurtenances. Fig. 8 is an end view of the base-plate and the adjustable measuring-weight therefrom suspended, this view corresponding with Fig. 6 looking in the direction pointed by the arrows $d$, except that the measuring-weight has been moved to the position indicated in broken outline at $6^h$. Fig. 9 is a perspective detail of the inlet-valve, which when opened admits the liquid to be weighed in the bottom of the receptacle, and this figure also shows a portion of the mechanism provided for operating such inlet-valve. Fig. 10 shows a vertical section of the same devices illustrated in Fig. 9. Fig. 11 is a perspective elevation of the valve for discharging the liquid that has been introduced into the receptacle. Fig. 12 is a vertical section of the last-described valve. Fig. 13 is a partial inverted plan of the base-plate 4, particularly illustrating that portion of the plate from which the adjustable measuring-weight is suspended. Fig. 14 is a vertical section of the base-plate on line $c\ c$ of Fig. 13, and this figure shows, besides, a like section of the measuring-weight and the means whereby it is movably and adjustably suspended from the under side of the base-plate. Fig. 15 is a plan of the under side of the adjustable measuring-weight and its appurtenances. Fig. 16 is a partial perspective of the measuring-weight, showing in particular the pivoted arm 6$^c$, the fixed arm 6$^f$, and the coöperation of the two, as well as other features of this part of our mechanism, which will be more clearly described in the body of this specification. Fig. 17 shows a partial perspective rear elevation of the liquid-receptacle, its base-plate, the graduated projecting ledge, and the adjustable weight, illustrating how the latter operates to register the volume or weight of the liquid dispensed. Two rows of markings are seen, the outer of which indicates the volume and the inner the weight of the liquid dispensed, the weight-marks being pointed to by the auxiliary index 6$^j$ on the arm 6$^f$. Fig. 18 shows a perspective elevation of the top of the liquid-receptacle. Fig. 19 is an inverted plan of the top plate 9 of the frame, particularly showing the mechanism for holding the inlet-valve open until the receptacle is tilted; and Fig. 20 is a detail in perspective of the trip 12$^c$ seen in the preceding figure.

The numerals designate the parts referred to in the description of our invention.

In its general construction our invention comprises a receptacle, preferably of cylindrical form, having axial bearings at its base, whereby it is supported in a suitable frame or stand. The supporting-frame and receptacle are adapted to coöperate with each other in such manner that the rocking of the receptacle is limited to an upright and slightly-leaning position. The receptacle is balanced as accurately as possible, and from it is suspended the adjustable weight for measuring the liquid introduced into the receptacle, the function of the weight being to hold the receptacle in an upright position until the liquid introduced therein overbalances the measuring-weight and causes the receptacle to tilt forward. The filling-pipe enters the head of the receptacle and extends to nearly the bottom thereof and has at its discharge end an automatic valve which when opened will be held open by a latch and allow the liquid to enter while the receptacle is in an upright position, but automatically closes itself as soon as the receptacle tilts forward, and a faucet is provided at the base of the receptacle for emptying the same, which faucet may be so adjusted as to operate automatically upon the tilting of the receptacle. When the receptacle leans forward, the automatic latch for the inlet-valve will not operate.

More particularly describing our weighing-machine, the same consists of a stand or frame, which may be made of any convenient and pleasing shape. Centrally between the base and top of the stand the same is provided with a cross-brace supporting two plates or tables 2 2$^a$ as bearings for the knife-edges 3 3$^a$, affixed to the base-plate 4 of the receptacle. The base-plate is a casting, which may be of the shape or form seen in the plan thereof shown in Fig. 6. The form therein given was adopted to make such plate of as light construction as possible consistent with strength and to adapt the plate to the requirements thereof. The knife-edges 3 are of triangular form and have been attached to the base-plate by providing a thickened portion having a beveled slot in which the knife-edges may be inserted, and the same are then secured by soldering or otherwise. On the periphery of the base-plate is a flange-rim within which to set the receptacle 8 and such receptacle being secured to the base-plate by means of screw-bolts extending through perforations 4$^b$ in the base-plate and corresponding perforations in the bottom of the receptacle. The annular opening 4$^c$ is provided to insert the discharge-faucet and stem. The annular flange 4$^d$ provides a bearing for the ring 6$^a$ of the adjustable weight 6. (See Figs. 13, 14, and 15.) The flange 4$^d$ is provided on the interior with perforated lugs 4$^e$, which perforations are threaded and receive the screws securing the plate 7, whereby the ring of the adjustable weight is held on its described bearings, as is more particularly illustrated by Fig. 14. The adjustable weight 6 comprises as its appurtenances the pocket 6$^b$, which is filled with lead, the ring 6$^a$, a part of its bearings, and the arms 6$^c$ 6$^f$. The pocket 6$^b$ is sufficiently weighted to make the weight proportional to the variable volume of liquid it is designed to support or balance in the receptacle. The semicircular ledge 4$^f$ projects horizontally at the rear from the base-plate, of which it forms an integral part. The rim of such ledge has a series of perforations 4$^g$, which perforations relatively agree with the adjustable weight 6, so as to represent arbitrary measurements—e.g., pints, quarts, &c., and fractions thereof. The position of the weight according to the measurement required is determined by the register or point of the index 6$^f$. As already mentioned, the perforations may be graduated to represent liquid-measure, and a segment of brass 6$^k$, fixed on the inner part of the ledge, graduated to indicate the weight in addition to its volume.

Our object in providing perforations in the rim of the ledge 4$^f$ is to obtain means for locking the weight in the exact position where it will indicate some arbitrary value or measurement. To bring this about, the weight has a projecting spring-controlled arm 6$^c$, provided with a pin 6$^d$, which when adjusted opposite to the particular perforation representing the measurement desired will enter a perforation 4$^g$ and lock the weight in place until the finger-piece 6$^e$ of the arm 6$^c$ is pressed upon, depressing the arm against the tension of the spring 6$^i$ and withdrawing the pin 6$^d$ from engagement with the perforation in which it is seated. A fixed arm 6$^f$ projects from the ring 6$^a$ and has at its end a socket 6$^g$ to receive the finger-piece 6$^e$. The lug 6$^h$ rides on the rim of the ledge 4$^f$. This lug $6^h$ serves also to point to the measurement at which the weight has been adjusted. The socket $6^g$ is provided as a convenience for operating the finger-piece of the arm $6^e$ and for confining the downward motion of the latter. The arm $6^e$ may thus be operated by pressure with the forefinger and thumb.

The receptacle 8 for the liquid is preferably of cylindrical form. Square cans could also be used, but experience has shown that they are not as easily balanced nor as satisfactory in the operation of weighing the liquid they hold. The top of the receptacle has an annular opening $8^a$, the rim of which is slightly raised to stiffen the same, and at $8^b$ the rim is considerably raised, so as to provide a flange which when the receptacle is in an upright position rests against a lug $9^a$ on the under side of the top plate 9. Through the opening $8^a$ the inlet-valve and its operative mechanism are inserted, such contrivances fixedly depending from the top plate 9, as shown in Fig. 2, and to accommodate the tilting of the weighing-receptacle the opening $8^a$ is made eccentrically, as observable from Fig. 18, being nearer the rear. The distance of the opening from the back is about as shown in Fig. 18. The small annular opening $8^c$ is provided to insert the outlet-valve or discharge-faucet 10, and when such valve has been inserted the opening $8^c$ is covered by a perforated disk $8^d$. The outlet-valve 10 comprises a socket $10^a$, fixed in the bottom of the receptacle and having inlet-openings $10^b$ and a spout $10^c$, a plunger $10^d$, stem $10^e$, and a ring or knob $10^f$. The stem of the outlet-valve extends through the forked end of the arm $9^b$, a part of the top plate 9. When the knob or ring $10^f$ of the outlet-valve stem is turned inward, as it is seen in Fig. 4, the plunger-valve $10^d$ will be lifted from its seat with each tilt of the liquid-receptacle. This is provided so as to have an automatic arrangement for emptying the liquid in the receptacle as soon as the receptacle tilts by reason of outweighing the measuring-weight. When the ring $10^f$, however, is turned to the opposite direction from that in which it is seen in Fig. 4, then the outlet-valve $10^d$ is no longer automatic, but must be operated by itself. This construction is desirable in case the liquid which has been weighed is not to be poured out immediately upon weighing. It may then be retained in the receptacle until it is to be poured out. The plunger-valve $10^d$ and its socket or seat must be nicely ground or otherwise fitted to each other, so as to not leak. There will, however, be some drippings from the spout of the outlet-valve, and to overcome the annoyance which is caused thereby we have provided a drip-pan 11, the bottom of which slightly declines rearward, so that while the liquid-receptacle is in an upright position the drippings from the spout $10^c$, falling on the bottom of such drip-pan, will be inclined forward, and the drippings therein collected will run out. The inlet-pipe 5 fixedly depends from the top plate 9 through perforations provided therefor in the central portion of the latter and comprises two sections $5\ 5^a$, united by an elbow, and has a valve on the lower section. The inlet-pipe is so positioned as to discharge at the bottom of the receptacle and about over its axis. The lower extremity of the inlet-pipe is threaded, and on such threaded end is affixed a neck $5^b$, having on its exterior a coarse thread. On the neck is a cap $5^c$, having a thread on its interior corresponding with that of the neck. On the base of the cap is a gasket $5^d$, which when the cap is turned firmly against the mouth or end of the neck $5^d$ closes the same, and the opening $5^e$ in the wall of the cap provides an outlet for the pipe 5 when the cap is turned down. For operating the cap $5^c$, closing and opening the inlet-pipe, we have provided a toothed flange $5^f$, meshing with a segment-gear $5^g$, fixed on the lower end of the rod or stem $5^h$, so that by rotating the said valve-stem the inlet-valve may be opened. A spring $5^i$ normally holds the inlet-valve shut. The inlet-valve is opened by operating the crank-handle $5^j$, fixed on the valve-stem. To hold the inlet-valve open against the spring $5^i$, we have provided a latch, the operation of which is more particularly shown in Fig. 19. Such figure, as already mentioned, shows the under side of the top plate 9, and the plan or top of the receptacle is indicated in broken outline. The inlet-valve stem $5^h$ has fixed to it below the top plate 9 a hammer 12, having a heel $12^a$ and a nose $12^b$. Such hammer coöperates with a trip $12^c$, pivoted to the under side of said top plate. The construction of such trip is better seen from Fig. 20, from which it will be observed that it has a heel $12^d$, a notch $12^e$, a nose $12^f$, and a lug $12^g$. The hammer 12 and the trip $12^c$ are shown in Fig. 19 in the position they would occupy after the inlet-valve has been opened. While the inlet-valve is closed the hammer would occupy the position approximately shown by its broken outline, and the trip $12^c$ would then be in the position indicated by the broken outline thereof. As the crank-handle $5^j$ of the inlet-valve is operated the heel $12^a$ of the hammer strikes against the heel $12^d$ of the trip and pushes the latter down until the free end of the trip strikes a stop 13 on the under side of the top plate. During the movement of the trip from its initial to its final position the nose of the hammer enters the notch $12^e$ in the toe $12^f$, and upon the crank-handle $5^j$ being now released the nose of the hammer is held in the notch of the trip, keeping the inlet-valve open until the trip is thrown back to its initial position. This throwing back of the trip is accomplished by a stud-pin $8^e$ on the upper surface of the top of the receptacle, which while the receptacle is in an upright position is positioned slightly in advance of the free end of the lever $12^c$ and as the receptacle is tilted forward strikes such lever and throws the same up, thereby releasing the hammer 12 and allowing the spring 5¹ to automatically close the inlet-valve. A dog 14, pivotally fixed to the top of the rear end of the receptacle, engages a flange 9ᶜ on the top plate when the receptacle has been tilted forward, and thus lock the can in a leaning position until released again and returned to the upright position. To enable the proper adjustment of the weight and place the same at extreme points—that is, the point nearest to and the point farthest distant from the axis or fulcrum of the weighing-receptacle within the limits of motion of the arm 6ᶠ on the graduated ledge 4ᶠ—the said arm is projected at right angles to a line intersecting centrally the weight and the center of the circular plan of its motion. In setting up the weighing-machine the weighing or liquid receptacle must be brought to a vertical alinement to be properly balanced. To accomplish this, we have provided the ledge 4ᶠ with two studs 6ˣ 6ʸ, which have been accurately leveled, so that the true balance of the weighing-receptacle will be found by alining the said ledge with the aid of a level set lengthwise on the two studs and crosswise from one thereof to the rim of the ledge. To balance the receptacle, we provide a weight 15, adjustable on a threaded horizontal rod 16. (Shown in Fig. 6.)

The opening 9ᵈ in the top plate is merely provided as a convenience to place a funnel in.

Having thus fully described our invention, now what we claim, and desire to secure by Letters Patent, is—

1. In a liquid-weighing machine, the combination with a stand; a cylindrical, rocking, weighing-receptacle, the supporting-stand therefor; the axial bearings at the base of receptacle whereby it is supported in said stand; and the means limiting the rocking of the receptacle to an upright and to a tilting position, of a measuring-weight suspended from and having circular adjustment under the base of the said weighing-receptacle rearward of its axis, and means for indicating the measuring capacity of the receptacle in accordance with the adjustment of said weight, substantially as described.

2. In a weighing-machine, the combination with a supporting-stand; a weighing rocking receptacle supported in said stand; a measuring-weight for retaining the receptacle in an upright position until the liquid introduced therein overbalances such weight, said weight being suspended from the base of the receptacle rearward of its axis, and being adjustable within a circular horizontal plane, the chord of the arc of movement of said weight being at a right angle to the axis of the receptacle; means for adjusting the weight in accordance with its weighing and measuring capacity; and means for automatically locking the weight upon its said adjustment, until released for readjustment, substantially as described.

3. In a liquid-weighing machine, the combination of a supporting-stand; a rocking receptacle, having a discharge-faucet; axial bearings at the base thereof, whereby it is supported in said stand; means limiting the rocking motion of the receptacle to an upright and to a tilting position; a dependent inlet-pipe, entering the receptacle and discharging at the bottom thereof, about over its axis; a spring-controlled valve normally closing the outlet of said pipe; a stem extending upwardly from the valve; an arm or handle on said stem; a latch for holding the valve open against the spring while the receptacle remains in an upright position; means carried by the receptacle for automatically releasing the valve again from the latch, upon the receptacle being tilted; a measuring-weight suspended from the base of the receptacle rearward of its axis, and adjustable within a circular plane, the chord of the arc of movement of said weight being at a right angle to the axis of the receptacle; means for adjusting the weight in accordance with its weighing and measuring capacity; and a latch for holding the receptacle in its tilting or emptying position until released for return to its receiving position, substantially as described.

4. In a weighing-machine, the combination of a supporting-stand; a rocking receptacle, having a discharge-spout; axial bearings at the base of the receptacle, whereby it is supported in said stand; a valve controlling the discharge-spout, and the means whereby said valve may be adjusted to open automatically with the tilting of the weighing-receptacle means limiting the rocking motion of the receptacle to an upright and to a tilting position; a dependent inlet-pipe suspended from the stand, entering the receptacle and discharging at the bottom thereof, about over its axis; a spring-controlled valve normally closing the outlet of said pipe; a stem extending upwardly from the valve, and an arm or handle on said stem; a latch for holding the valve open against the spring while the receptacle remains in an upright position; means carried by the receptacle for automatically releasing the valve again from the latch, upon the receptacle being tilted; a weight suspended from the base of the receptacle, rearward of its axis, and adjustable within a circular, horizontal plane, the chord of the arc of movement of said weight being at a right angle to the axis of the receptacle; and means for adjusting the weight in accordance with its weighing and measuring capacity, substantially as described.

5. In a liquid-weighing machine, the combination with a supporting-stand; a balanced receptacle, having axial bearings and supported in said stand, and the inlet or filling pipe entering said receptacle; of a valve controlling the discharge end of such inlet-pipe, and the mechanism operating said valve, the same comprising a neck 5ᵇ, having a coarse exterior thread; the cap 5ᶜ having an interior thread corresponding to that of the neck, there being an opening in the cap providing an outlet from the inlet-pipe; the toothed flange $5^f$ on the cap; the valve-stem $5^h$; the segment-gear $5^g$ on said valve-stem, meshing with said toothed flange; the coil-spring $5^i$, and crank-handle $5^j$, and a suitable latch for holding the inlet-valve open against said spring; and means for tripping the latch with the tilting of the receptacle, substantially as described.

6. In a liquid-weighing machine, the combination with a supporting-stand; a balanced receptacle, having axial bearings and supported in said stand; and the inlet or filling pipe entering said receptacle; of a valve controlling the discharge end of such inlet-pipe, and the mechanism operating said valve, the same comprising a neck $5^b$, having a coarse exterior thread; the cap $5^c$ having an interior thread, corresponding to that of the neck, there being an opening in the cap providing an outlet from the inlet-pipe; the toothed flange $5^f$ on the cap; the valve-stem $5^h$; the segment-gear $5^g$ on said valve-stem, meshing with said toothed flange; the coil-spring $5^i$, and crank-handle $5^j$; the hammer 12 on the valve-stem; the trip $12^c$ pivoted to the under side of the top plate of the stand; and the stud-pin $8^c$ on the upper surface of the top of the receptacle, constituting an automatic latch for holding the valve of the inlet-pipe open against the spring until the receptacle is tilted, substantially as described.

7. A liquid-weighing machine, comprising in combination a supporting-stand; a balanced, rocking receptacle, having a discharge-spout at the bottom thereof; the base-plate supporting the receptacle, and the graduated ledge of such base-plate, projecting rearwardly from the receptacle; axial bearings whereby said receptacle is supported at its base, in said stand; means limiting the rocking motion of the receptacle to an upright and to a tilting position; means for adjusting the balance of the receptacle; a dependent inlet-pipe, entering said receptacle and discharging at the bottom thereof, about over its axis; a valve controlling the discharge end of such inlet-pipe, and mechanism for operating such valve, consisting of a neck $5^b$, having a coarse exterior thread; the cap $5^c$, having an interior thread corresponding with that of the neck, and an opening providing an outlet for the inlet-pipe; the toothed flange $5^f$ on the cap; the valve-stem $5^h$; the segment-gear $5^g$ on said valve-stem, meshing with said toothed flange; the coil-spring $5^i$ and the crank-handle $5^j$; the hammer 12 on the valve-stem; the trip $12^c$ pivoted to the under side of the top plate of the stand, and the stud-pin $8^c$ on the under surface of the top of the receptacle, constituting an automatic latch for holding the inlet-valve open until tilted; a measuring-weight for retaining the receptacle in an upright position, until the liquid introduced therein overbalances such weight; said weight being suspended from the under side of said base-plate, in bearings therefor provided, rearward of the axis of the receptacle, and being adjustable within a circular horizontal plane, the chord of the arc of movement of said weight being at a right angle to the axis of the receptacle; an arm extending from the weight whereby the latter is adjusted as to its weighing and measuring capacity, according to the scale, and said adjustment is indicated on said graduated ledge; means automatically locking the weight upon its said adjustment until released for readjustment; a latch for holding the receptacle in its tilting or emptying position, until released for return to its receiving position; a plunger-valve controlling said discharge-spout of the receptacle; the valve-stem upwardly extending from said plunger-valve; a ring or knob on the end of said stem; a forked arm projecting from the top of the stand, with which the valve-stem may be placed in engagement, so as to open the said discharge-spout automatically; and a drip-pan suspended below said discharge-spout, and adapted to empty itself with each tilting of the weighing-receptacle, substantially as described.

In testimony whereof we have hereunto affixed our signatures, in the presence of two witnesses, this 29th day of December, 1899.

SAMUEL P. MACKEY.
   FRANK H. GILBERT.

Witnesses:
 T. J. GEISLER,
 M. D. HOYT.